Patented Nov. 7, 1944

2,362,430

UNITED STATES PATENT OFFICE 2,362,430

ARTICLES OF NONMETALLIC MINERAL COMPOUNDS AND METHOD OF PRODUCING SAME

Martin J. Buerger, Arlington, Mass., assignor to Arthur D. Little, Inc., a corporation of Massachusetts No Drawing. Application March 31, 1942,
Serial No. 436,964

4 Claims. (Cl. 18—48)

This invention relates to the preparation of dense compacted coherent articles from non-metallic mineral compounds which are characterized by having plastically deformable crystals, and to the articles so prepared.

In particular, this invention has to do with the manipulation, under controlled conditions of time, temperature, and pressure, of certain types of compounds in comminuted or pulverized form to produce coherent compacted articles having a density very nearly equal to the theoretical density of the compound so treated. The compounds amenable to this treatment are characterized by having a crystalline structure, the crystals of which are plastically deformable, and by being of a non-metallic nature. Hence, the metals are excluded from the range of compounds included herein, as are also compounds having metallic characteristics (e. g. ready electrical conductivity) such as the carbides. Furthermore, the compounds to which this invention is applicable must be capable of undergoing the pressure and temperature conditions of the present process without decomposition—e. g. without significant loss of water of crystallization or constitution, carbon dioxide, sulfur dioxide, or other fractions of their original constitution.

The plastic deformability of crystals may be determined in accordance with the procedure set forth in Neues Jahrb. Mineral. Geol. Beil.—Bd. 45, 121–48 (1921) by K. Veit. Briefly stated, this procedure involves the placing of a crystal of the substance to be examined within a mass of an appropriate supporting and enveloping medium such as powdered sulfur, and applying sufficient pressure at normal or raised temperature (the pressure and temperature being adjusted to the material treated) to cause a change in shape of the crystal. If the crystal is deformed by the gliding of its constituent parts along the gliding planes of the crystal, without rupture, it is "plastically deformable." If, however, under the conditions imposed, the crystal breaks so that it may even be shattered to a powder, it is not plastically deformable. Again, some crystals, due to lack of proper gliding planes in their structure are unaffected even by the most extreme conditions of this testing procedure, and hence are also not plastically deformable.

Another and generally more convenient method of ascertaining whether or not a substance is composed of plastically deformable crystals is to determine whether or not the substance can be pressed without binder at a pressure of up to 100 tons per square inch, or more if attainable, to a self-sustaining body of at least 90% of the true (theoretical) specific gravity of the substance, such pressure being applied at a temperature definitely below the melting, sintering, or vitrification point of any of the constituent particles of substance.

Plastic deformation as thus defined is not to be confused with the "plasticity" of clays as commonly referred to in the ceramic industry. The plasticity of clays is due to the sliding relative to each other of discrete particles of clay, this sliding being lubricated by a liquid medium, usually water. But in the plastic deformation of crystals, the rearrangement takes place within individual crystals (which remain intact) rather than between particles.

Briefly stated, the procedure of this invention comprises the following steps: A compound characterized by having its crystals plastically deformable, prepared to suitable fineness, as by grinding, for example, is charged into a mold having a suitable shape and size. The charge is then subjected to pressure and temperature (including room temperature) conditions sufficient to compact it into a dense, solid, coherent body. These pressure and temperature conditions are such that the body formed thereby possesses a specific gravity which approaches the theoretical for a voidless solid (e. g. a single crystal) of the compound treated. In practicing this invention the specific gravity thus obtained is at least 75% of theoretical and is preferably and more generally between 90% and 100% of theoretical.

The body thus produced can be readily handled, and can withstand a moderate amount of shock, without cracking or breaking. It may be machined, if desired, as at this stage it has not received its final hardening treatment. Hence instead of attempting to make complicated shapes by the operations already described, it is frequently more convenient to prepare simple shapes and then cut, grind, or otherwise machine them to their final shapes and sizes.

A further characteristic of the bodies prepared as above described and having substantially their theoretical specific gravity is their shape- and size-stability on subjection to the high temperatures described below. In the conventional ceramic art, pressed bodies of ceramic materials undergo a considerable shrinkage during the final firing; hence they can not conveniently be machined to accurate sizes and shapes before firing. Consequently, it is customary to press them to a larger size than final, to allow for shrinkage during firing. Such procedure gives close enough results for most of the purposes to which ceramic bodies are put, but it limits their use, in most instances, to products in which close tolerances and accurate and strictly uniform sizes are not necessary. In accordance with the present invention it is possible to make products which have negligible shrinkage on final firing, although the amount depends upon the temperature and is greater with higher temperatures. Thus, firing fluorite products at 1200° C. generally causes around 2% shrinkage in each direction, while firing the same at 900° C. generally causes less than 1% shrinkage. With proper control of all factors, this shrinkage may readily be controlled to within 1% in each direction, or less than 3% on volume.

The pressing operation already described may be carried out on the powdered compound entirely free from water, binder, or other extraneous materials. However, for ready commercial operation it is frequently desirable to use very minor amount of water, binder, and mold lubricant, or any of them. Thus, the binder may be used to agglomerate the powder into pellets for feeding to automatic molding apparatus. The total amount of all such extraneous materials used, however, must be kept lower than enough to fill the voids in the pressed product, generally in the order of 5% or less, by volume, of the pressed product.

It is believed, although this explanation is not insisted upon, that the pressure and temperature conditions of the operation already described herein act upon the minute particles of the compound under treatment in such a way that these particles or crystals or crystal fragments are made to undergo slip along gliding planes, or warped or otherwise caused to flow plastically, and also possibly crushed, to arrange themselves into closed contact, touching each other at many points and surfaces and substantially filling the voids originally present before pressing. The pressure and temperature should be such as to produce such conditions; appropriate ranges suitable for practical operations are described in the examples given subsequently herein. More specifically, the temperature may range from about room temperature (or even lower on some occasions) to a few hundred degrees centigrade, not so high that the temperature has any appreciable effect upon the mold (e. g. to cause warping) under the pressure imposed, or to cause any melting or vitrification of the compound being pressed. The pressure may range from a few tons to fifty or more tons per square inch. No special time requirements need be observed; the pressure is applied under proper temperature conditions (e. g. with both mold and powder heated if elevated temperatures are used) and then removed. A time of about one minute is sufficient; longer times do not contribute any marked improvement in the product.

Following the pressing operation, it is generally desirable, although not always necessary, to subject the resulting body (after any machining that may be required) to a heating step at a temperature above that which obtained during the pressing step but below a temperature at which any melting or vitrification takes place. The effect of this heating step is to bring about crystal growth, which can be observed by examining representative samples before and after heating. Also, it is believed that the heating acts to relieve the presumably strained state of the crystals and fragments in the pressed unheated body. However that may be, the final heat-treated product possesses a resistance to shock and compression and a lack of porosity generally comparable to that of commercial ceramic bodies. This product is therefore characterized by being held together by forces developed across grain boundaries as a result of grain growth rather than by any melting or vitrification.

This invention will now be described in greater detail in the following examples, which are to be considered as illustrative rather than limiting:

Example I

Samples of calcium sulfate of sufficient fineness that 93% passed a 40-mesh screen, and 4% passed a 300-mesh screen, were molded at 40 tons per square inch, at room temperature. The resulting articles, which had densities ranging between 2.40 and 2.43 (81 to 82% of theoretical) were fired at 1020° C. for 2 hours, giving final products of densities ranging between 2.57 and 2.63, or about 87 to 89% of theoretical, which is 2.96 for anhydrite ($CaSO_4$).

Example II

Following the procedure of Example I, but using calcium sulfate ground finely enough to pass a 300-mesh screen, final fired products were obtained having densities 91.3 to 92.6% of theoretical.

The following examples, carried out on fluorite, serve to illustrate more fully the considerable range of operating conditions possible, and also to show how variations in these conditions affect the products. The theoretical or true density of fluorite is 3.15, and its melting point is about 1352° C. The firing time in each case is preceded by an appropriate preheating time of several hours to bring the article up to temperature.

Example III

Fluorite, ground to pass a 170-mesh screen, is molded at room temperature, at a pressure of 40 tons per square inch. Density after firing at 1027° C. for about 7 hours is 2.88, or 91.4% of theoretical. The average compressive strength of cylindrical-shaped pieces so prepared is 28,000 pounds per square inch.

Example IV

Fluorite, ground to pass a 200-mesh screen, is molded at 40 tons per square inch pressure at a temperature of 300° C., both powder and mold being maintained at this temperature. The product has a density of 3.01 or 95.6% of theoretical, before firing. After firing at 900° C. for 4 hours the product has a density of 3.02, while a product made the same way but fired at 1200° C. for 4 hours shows a density of 3.07, or 97.5% of theoretical.

Example V

Proceeding as in Example IV, but using a pressure of 10 tons per square inch, a product is obtained having a density of 2.70 unfired, 2.77 fired at 900° C., and 2.93 fired at 1200° C., or 85.8, 88.0, and 93.0% respectively of theoretical. Firing time is about 4 hours in each case.

Example VI

Proceeding as in Example III, but using coarser material, ground to pass a 100-mesh screen, products are obtained having substantially the same properties. For example, such a product, fired at 1000° C. for 4 hours, showed a density of 2.86.

Example VII

Ceramic materials in order to be suitable for use for certain electrical parts, such as spark plugs, must pass a test to show resistance to lead oxide. In order to determine the effects of this test upon products made in accordance with this invention two sets of such products were made, referred to as A and B below.

Set A was made from fluorite ground to pass a 200 mesh screen, pressed at 40 tons per square inch, at room temperature, and the cylinders so formed were bored out to form cavities for holding the lead oxide. These bored cylinders were then fired at 1200° C. for 4 hours.

Set B was similarly prepared, but was pressed at 20 tons per square inch and a temperature of 50° C.

Samples from each set were subjected to the lead oxide test, by filling the cavities with lead oxide and maintaining the whole at 1800° F. (982° C.) for 8 hours. None of the samples showed any significant attack by the lead oxide.

It is not necessary that the material to be molded be charged into the mold as a powder. For example, the finely-divided material may first be agglomerated and the agglomerate then broken up to fairly large particle size (say ¼ to ⅛ inch), or may be pelleted, and the resulting particles or pellets charged to the mold. The individual particles which constitute these larger particles or pellets will, however, be of the fineness already pointed out.

The procedure of this invention is similarly operable on other materials of the class described. With such other materials, the molding pressure and temperature may be higher or lower in proportion as the crystals of the material are more or less readily plastically deformable; also, the firing temperatures and the molding temperatures are modified as may be necessary to ensure that they are not so high as to result in any melting, sintering or vitrification of the particles of the product. The firing time and temperature should be sufficient to effect adequate recrystallization so that the final product shall have desirable properties of strength, density, imperviousness, etc. The time required to raise an article to firing temperature depends largely upon the size and shape of the article, and the temperature to which it has to be raised.

I claim:

1. Process which comprises compacting a finely divided fluorite compound in the substantial absence of binders and water, under conditions of temperature and pressure to cause plastic flow and compacting of the compound to a specific gravity of not less than about 90% of its true specific gravity, the temperature being below the melting or vitrification temperature of said compound and heat treating the compacted compound at a temperature below a point where any melting or vitrification of said compound occurs but sufficient to cause intercrystalline growth and thereby improve the cohesion of the particles of the final article.

2. A dense coherent shaped article consisting of a compacted mass of particles of a non-metallic compound whose crystals are plastically deformable, said article having a specific gravity of not less than about 75% of the true specific gravity of said compound, said particles consisting of crystals bonded together by intercrystalline growth and being free from any molten or vitreous phase, the non-metallic compound being fluorite.

3. Process which comprises compacting a finely-divided non-metallic compound whose crystals are plastically deformable, in the substantial absence of binders and water, under conditions of temperature and pressure to cause plastic flow and compacting of the compound to a specific gravity of not less than about 90% of its true specific gravity, said temperature being below the melting or vitrification temperature of said compound, and then heat-treating the compacted compound at a temperature below a point where any melting or vitrification of said compound occurs but sufficient to cause intercrystalline growth and thereby improve the cohesion of the particles of the final article.

4. Process which comprises compacting a finely-divided non-metallic compound whose crystals are plastically deformable, in the substantial absence of binders and water, under conditions of temperature and pressure to cause plastic flow and compacting of the compound to a specific gravity of not less than about 90% of its true specific gravity, said temperature being below the melting or vitrification temperature of said compound, the finely-divided non-metallic compound being fluorite.

MARTIN J. BUERGER.